INVENTOR
EDMUND F. WOLLMANN

United States Patent Office 3,392,968
Patented July 16, 1968

3,392,968
EXHAUST GAS PURIFICATION AND
FILTRATION DEVICE
Edmund F. Wollmann, 14250 Dundee,
Riverview, Mich. 48192
Filed Aug. 3, 1966, Ser. No. 575,915
10 Claims. (Cl. 261—121)

This invention relates to an exhaust gas purification device adapted primarily to solve air pollution problems.

It is a primary object of the present invention to provide a means for solving air pollution and providing for industrial plants a means of eliminating unnecessary expenses in the control of exhaust gasses and in the collection of by-products therefrom for practical usage, which may be profitable and will to an extent counterbalance the expense of maintaining exhaust purification and filtration apparatus of the present type.

The attitude of the industrial plants towards air pollution control and air purification can be benefically modified if it can be established that the present exhaust gas purification device can lead to additional profits in the recapture of compounds found in said exhaust gasses, heretofore wasted.

While the present device is primarily directed for use by industrial plants for exhaust gas purification and filtration, it is a further object that the present device could be readily adapted for use with automotive or other vehicles.

These and other objects will be seen from the following specification and claims in conjunction with the appended drawings in which:

It will be understood that the above drawing illustrates merely a preferred embodiment of the invention by way of illustration, and that other embodiments are contemplated within the scope of the claims hereafter set forth.

Figure 1:
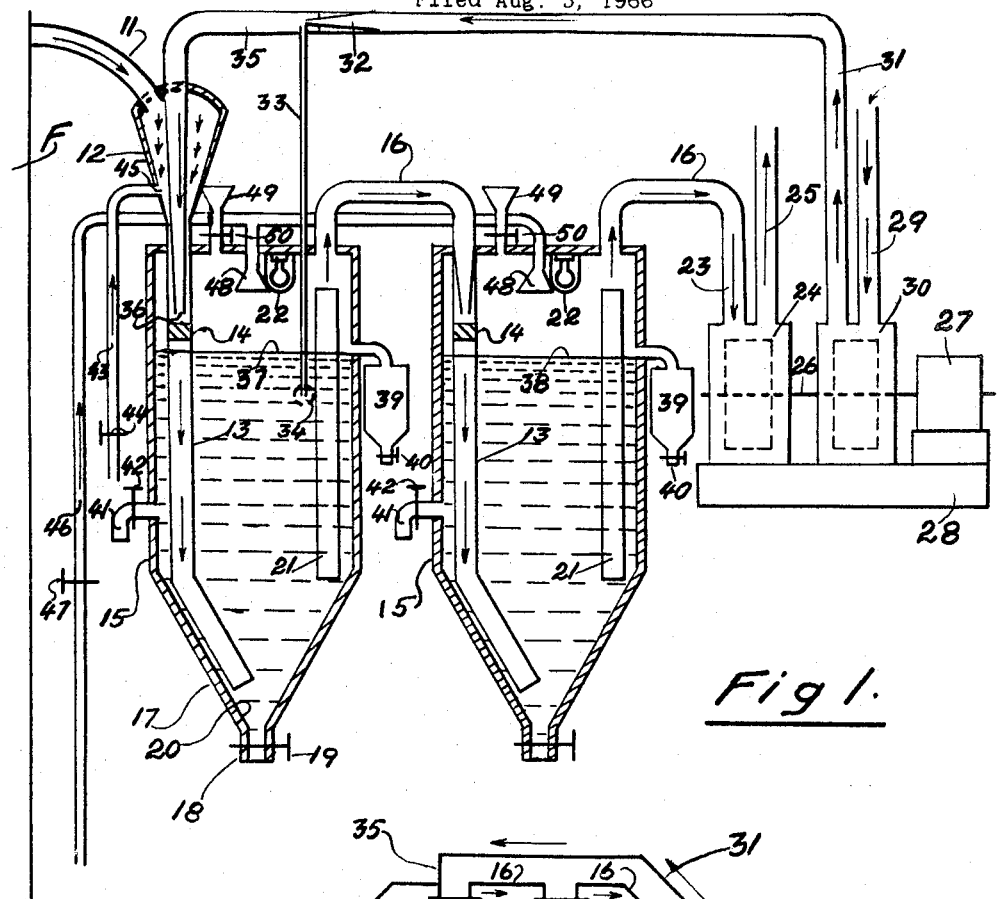
FIG. 1 is a schematic view of the present exhaust gas purification and filtration apparatus.

Referring particularly to FIG. 1, the present exhaust gas purification and filtration device, shows schematically a furnace F fragmentarily as providing a source of exhaust gasses. Source of gas could be any industrial plant or furnace or internal combustion engine or vehicle which includes an exhaust gas delivery pipe 11 whose outlet end extends down into a funnel-shaped premix inlet 12 having a delivery pipe 13 at the top of and extending down into tank 15. The lower end of said tank is coneshaped at 17 and terminated in drain 18 with hand valve 19 to permit intermittent removal of sludge or mud.

Tank 15 is suitably lined as at 20 with preferably a plastic or other chemically resistant material, and is adapted to hold a quantity of water maintained at a normal predetermined level 37. Outlet pipe 16 at the top of tank 15 provides for the delivery of exhaust gasses from which certain contaminants have been removed in the water or solution in tank 15.

Outlet 16 could be to the atmosphere or to a low pressure source, such as a blower as shown in FIG. 1 for exhausting to atmosphere.

In the illustrated embodiment of the invention there is, however, provided a second tank of the same construction as tank 15 and which is adapted to contain a quantity of water maintaining a predetermined fluid level 38 and which also contains desired chemicals to faciliate absorption and dissolution of the obnoxious and objectional ingredients in the exhaust gas mixture and which remain and which flow from tank 15 through the pipe 16.

In this case, the outlet pipe 16 extends down into the second tank of FIG. 1 and terminates in a delivery pipe 13 whose outlet is adjacent the lower end of the second tank for delivery of exhaust gasses into the chemical solution therein.

Upright glass or transparent plastic windows 21 are arranged within the side walls of the respective tanks to provide for visual inspection of the interior of the said tanks and for observing the filtration and mixing and dissolving actions and to also determine visably the nature of the mud or sludge which accumulates in the respective tanks.

To facilitate such visual inspection there is provided upon the interior of each of the said tanks a glass enclosed illuminating means 22.

The second upright tank, also has an elongated outlet pipe 16 at its upper end similar to the corresponding outlet pipe on the first tank which by conduit 23 extends into the exhaust blower 24 whose outlet 25 communicates with the atmosphere for delivering purified exhaust by-products to the atmosphere or alternately a purified gas or air.

The motor 27, schematically shown, mounted upon support 28 includes a driveshaft 26 connected with the blower 24, schematically shown, which is adapted to produce a low pressure condition in the exhaust pipes 16 for drawing purified gasses therefrom and for direction through the outlet 25 to atmosphere.

A second blower 30 mounted upon support 28 and connected to driveshaft 26 provides a means through inelt 29 of directing air under pressure to the air pipe 31. Said pipe at its other end 35 extends down into the premix inlet 12 down into delivery pipe 13 and includes a converging outlet 36 spaced above fluid level 37.

An air jet 32 is provided upon the interior of air pipe 31 delivering air at increased velocity through air pipe 35 joined to air pipe 31.

Pipe 33 with suitable filtration means 34 at a source of water or steam extends up into air delivery pipe 31 adjacent the venturi or low pressure point relative to jet 32 by which either water or steam is directed into pipe 35 for providing a prerinse moisturizing mixture with the incoming exhaust gases from the premix inlet 12.

Adjacent each of the tanks 15 on the exterior thereof are overflow tanks 39 with suitable valved drains 40 and which are connected to the respective tanks adjacent fluid levels 37 and 38 respectively to prevent a rise of the fluid level to an undesirable point, thus, maintaining the fluid level 37–38.

Each of the tanks has an outlet 41 intermediate its ends and towards its lower end including suitable hand valve 42 by which fluids from the respective tanks can be withdrawn as desired for drainage or for taking samples for analysis.

An additional water supply pipe 43 is provided, connected to a suitable source of water under pressure and is provided with a suitable hand valve 44. Pipe 43 is adapted to deliver at 45 a quantity of water into the premix inlet 12, as desired for cleaning out inlet 12 and for washing down any particles that accumulate.

Within the delivery pipes 13 above the fluid level and in advance of the air delivery pipe outlet 36 there are provided respectively, a series of angularly arranged gas deflection plates 14 for providing a high velocity whirling and mixing action to the moisturized incoming exhaust gasses creating a highly turbulent condition and providing for an efficient delivery and dispersal of the gasses to be filtered and purified into the fluids within the respective tanks for a more uniform application and contact and exposure to the fluids therein.

Additional water supply pipe 46 with hand valve 47 is adapted for connection to an additional source of water supply and provides a pair of shower or sprinkler outlets 48 which communicate down into the interior of the respective tanks at their upper ends to facilitate rinsing out of the tank or washing the same as desired or for the addition of fluids thereinto.

Each of tanks 15 have funnel-shaped inlets 49 with control valves 50. The purpose of the funnel-shaped inlets 49 is to introduce highly concentrated water solutions of acid or caustics or salts into the tank. This will occur when the tank has to be filled up after it was cleaned out, or this adding of more concentrated solutions will take place during operations after an analyzed sample taken from outlets 41 shows that the solution in the tank is too weak. Highly concentrated water solutions are emphasized, since the use of more water than is necessary is not recommended and to keep overflow from tank 15 into overflow tank 39 to a minimum. The reason for this is that the overflow solution cannot be drained into the sewer system to create an additional water pollution problem.

Operation

Smoke or contaminated air coming from a furnace or other source F enters through pipe 11, the premix inlet 12 where there is premix of the said exhaust gasses due to the entry under pressure and at high velocity of water or steam mixed with air through the air pipe 35 outletting at 36 within delivery pipe 13.

The prerinsed exhaust gasses enter the whirling device 14 causing a whirling and rotating action by which the mixture of gas and moisture is forced more intensely through the delivery pipe 13 down into the tank 15 filled with tap water or, depending upon the nature of the contaminated air, with tap water and a suitable dissolved chemical.

All solid particles from the incoming smoke or contaminated air should precipitate into the fluid in the tank 15 which collects as sludge or mud at the lower end of said tank and can be withdrawn from time to time through the outlet 18.

The remaining gas mixture comes up through the liquid within said tank above the fluid level 37 escapes through the pipe 16 under pressure and by virtue of a suction created by the exhaust blower 24, FIG. 1.

This exhaust mixture which is partly purified from the absorption operation in tank 15 passes through the outlet 16 and through a corresponding delivery pipe 13 into the second tank 15 which is primarily to dispose of undesirable gasses and odors. The purified air then travels through outlet 16 of the second tank and by means of the blower 24 is delivered to atmosphere through the outlet 25.

The air under pressure supplied through the air pipe 31–35 by virtue of the jet 32 and in conjunction with the water or steam supply pipe 33 creates in effect, an atomizer developing a water mixture within the outlet portion 35 of the said air pipe.

Therefore, while water is contemplated for delivery through the pipe 33, many commercial plants permit waste steam to be delivered to atmosphere. This waste steam could be connected into the pipe 33 and used in the present system by slight modification.

The inlet funnels 49 at the top of the respective tanks provides the introduction of water and chemicals such as acid, caustics or salt whenever necessary.

When the tanks 15 are emptied from time to time they may be rinsed out utilizing the shower heads 48.

The provision of applicant's swirling mechanisms 14 within the respective delivery pipes 13 provides uniform mixture of steam or water or gas at a high speed rotating motion with certain centrifugal forces provided so that when the mixed gasses are released at the bottom of the outlet pipes 13, the gasses are spread widely throughout the entire volume of the fluid within the tank for more effective absorption than would otherwise be possible if the swirling devices were omitted. Thus, employing the present swirling device efficiency of the tanks 15 is increased and, thus, for absorption of a certain amount of impurities from the gaseous exhaust mixtures smaller tanks in proportion can be employed. This is particularly useful when the present purification device is used in conjunction with vehicle exhaust or the exhaust from internal combustion engines.

In the present construction the swirling device consists of a series of blades 14 which are attached to the inner wall of the metal tubing and with the central portion open receiving the said moving gasses to deflect the same and to create the swirling action described.

The present built-in windows 21 in the said tanks permit observation of the liquid level in the tank and to observe during dumping and cleaning and rinsing process and make observation of the cleaning process easier. There is employed the present illuminating means 22.

Instead of ordinary steel tanks, not chemically resistant completely, present tanks have been coated with a suitable plastic material, preferably white, or other color which contrasts with the color of the contamination sought to be removed in the cleaning or purification process.

It is contemplated under some conditions that a single or first tank 15 of FIG. 1 may be sufficient for the purification process. However, for additional purification which requires chemical reaction, there sometimes will be found advantages in the employing of a second tank which contains chemicals.

Figure 2:
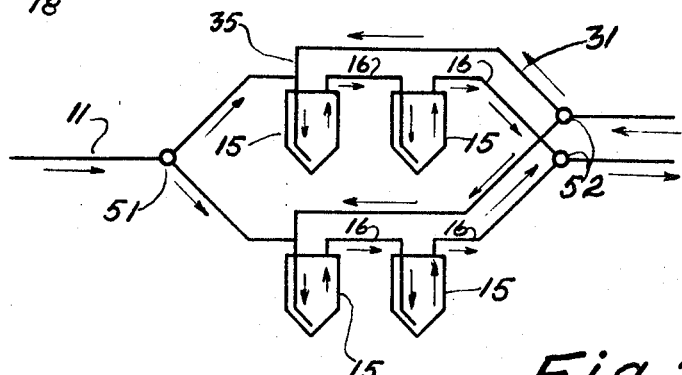
FIG. 2 is a schematic view of a two-unit gas purification device.

FIG. 2 is a schematic illustration of a double system for 24-hour operation, for example. It is noted in FIG. 2 that schematic illustration in FIG. 1 is duplicated and that in the exhaust pipe 11 leading to the respective two sets of tanks 15 there is a two-way valve 51 and corresponding to the respective outlets 16, a second two-way valve 52. Accordingly, the function of the apparatus may be switched from one set of tanks to the other and, thus, permit cleaning out of the first set of tanks and thus provide for a continuous operation.

The primary function of first tank 15 is for the withdrawal of solid particles from the gasses. For complete absorption, however, the exhaust partially purified is transmitted through the outlet 16 of the first tank down into the second tank 15 for certain chemical actions to provide for the dissolution or precipitation of other solids or contaminants in the exhaust gasses which have not been removed in the flow of the gas through the first tank.

For example, one of the primary objectives in present gas purification devices is to prevent discharge to the atmosphere of excessive amounts of sulphur dioxide.

There are several different possibilities for processing this gas depending upon the desired form in which a sulphur dioxide as processed as a by-product could be converted. These are as follows: (1) sulphur dioxide as a pure gas, (2) complete decomposition of the gas wherein solid elementary sulphur is produced as an end product, (3) complete absorption of a gas in a caustic chemical solution.

Sulphur dioxide is easily purified by scrubbing with water, then dried over concentrated sulphuric acid and can be liquified at room temperature by pressure alone (3 atmospheres at 20° C.). There are many technical uses for pure sulphur dioxide.

Sulphur dioxide decomposes easily with hydrogen sulfide by the presence of water according to the following chemical equation:

$$SO_2 + 2H_2S \rightarrow 3S + 2H_2O$$

Some plants might contaminate the air besides with sulphur dioxide, also with hydrogen sulfide.

Sulphur dioxide and sodium hydroxide react to sodium-bi-sulfate:

$$SO_2 + NaOH \rightarrow NaHSO_3$$

Sodium-bi-sulfate is used for bleaching and in the production of paper.

The present invention is distinguishable from devices heretofore employed in that the source of compressed air does not mix and is not contaminated by the exhaust gasses, is remote therefrom. When contaminated gasses enter the blower device, there is always the danger of plugging up or damage to the blower. In the present disclosure the blowers employed are exposed only to air which has already been purified.

The shape of the present tanks with the cone-shaped drain portions 17 facilitates dumping and emptying and subsequent rinsing of the tanks by application of fluids through the shower heads 48. Present prerinse inlet 12 provides a means for preventing accumulation of particles in the prerinse inlet and in the delivery pipes 13, respectively.

The present invention is directed to a gas purification filter mechanism which is relatively simple compared to prior efforts in this direction and thus with a simplified device the possibility for malfunction is minimized. Mechanical filtration is not sufficient for solving the present problem of air pollution and, accordingly, the incorporation of chemical solutions into the purification process forms a part of the present invention, not only for dissolving air impurities, but converting these undesired impurities into useful by-products.

It is contemplated, furthermore, that different chemical solutions would be applied in each individual case depending upon nature of the pollution which has been analyzed for providing the correct chemical reaction within the respective tanks for the separation thereof of the pollutants and for their possible reuse as by-products. The proper analysis of the polluted air or gasses will generally indicate the contents thereof and, thus, indicate the required chemical solutions required for the chemical reactions, absorption or precipitation or preparation, as the case may be.

For illustration, one of the tanks 15 may contain alcohol, considered effective in the removal of certain cancer producing compounds and ingredients believed present in vehicle exhausts.

Having described my invention, reference should now be had to the following claims.

I claim:
1. An exhaust gas purification device, comprising:
an upright tank adapted to hold a quantity of water at a predetermined fluid level and having a bottom valved drain for intermittent removal of sludge;
a funnel-shaped premix inlet at the top of the tank;
an elongated delivery pipe depending from said premix inlet extending down into the tank having an outlet adjacent its lower end;
an exhaust gas delivery pipe extending into said premix inlet;
an air pipe connected to a source of air pressure extending through said premix inlet and down into said delivery pipe having an outlet above said fluid level;
an air jet on the interior of said air pipe;
a water supply pipe connected to said air pipe adjacent said air jet;
water mixing with air under pressure and flowing into said premix delivery pipe for mixing with said exhaust gases providing a water mist prerinse of said exhaust gases before delivery into said tank;
and an outlet pipe at the top of said tank for delivery of exhaust gasses from which certain contaminants have been removed.
2. The exhaust gas purification device of claim 1, and a set of angularly arranged gas control and deflection blades in said premix delivery pipe above said fluid level and in advance of said air pipe outlet providing a high velocity whirling and mixing action to the moisturized incoming exhaust gases, for delivery and dispersal into the water of said tank.
3. The exhaust gas purification device of claim 1:
a second upright tank adapted to hold a quantity of water and chemicals at a predetermined level for neutralizing said exhaust gasses and having a bottom valved drain;
the outlet pipe from said first tank extending down into said second tank and terminating in a second elongated delivery pipe having an outlet adjacent to bottom of said second tank;
an outlet pipe at the top of said second tank;
and a power-operated exhaust blower connected to said latter outlet pipe for delivering purified air to the atmosphere.
4. The exhaust gas purification device of claim 2:
a second upright tank adapted to hold a quantity of water and chemicals at a predetermined level for neutralizing said exhaust gasses and having a bottom valved drain;
the outlet pipe from said first tank extending down into said second tank and terminating in a second elongated delivery pipe having an outlet adjacent the bottom of said second tank;
an outlet pipe at the top of said second tank;
and a power-operated exhaust blower connected to said latter outlet pipe for delivering purified air to the atmosphere.
5. The purification device of claim 4, and a set of angularly arranged gas control and deflection blades, in the delivery pipe of said second tank above its fluid level providing a high velocity whirling and mixing action to said gasses for delivery and dispersal into said second tank.
6. In the purification device of claim 4:
upright elongated transparent panels in the walls of each tank for visual inspection of the mixing action;
and illuminating means within each tank.
7. In the purification device of claim 4:
a second water delivery pipe connected to a water source and having a pair of shower outlets extending into each tank at its upper end, respectively, to facilitate rinsing thereof.
8. In the purification device of claim 4:
an upright overflow tank along the side of each tank, respectively, and connected thereto adjacent their predetermined fluid levels;
and valve drains for each overflow tank.
9. In the purification device of claim 1, a water supply pipe having a control valve connected to said premix inlet.
10. In the purification device of claim 1, said water supply pipe having its intake within the liquid in said tank.

References Cited
UNITED STATES PATENTS

| | | | |
|---|---|---|---|
| 1,138,202 | 5/1915 | Erlwein et al. | 261—121 |
| 1,155,386 | 10/1915 | Tschudy | 261—121 XR |
| 1,594,947 | 8/1926 | Hartman et al. | 261—125 XR |
| 1,939,949 | 12/1933 | Bertram | 261—121 |
| 2,050,797 | 8/1936 | Kerschbaum et al. | 55—229 XR |
| 3,256,068 | 6/1966 | Burke et al. | 261—125 XR |

HARRY B. THORNTON, *Primary Examiner.*
E. H. RENNER, *Assistant Examiner.*